UNITED STATES PATENT OFFICE.

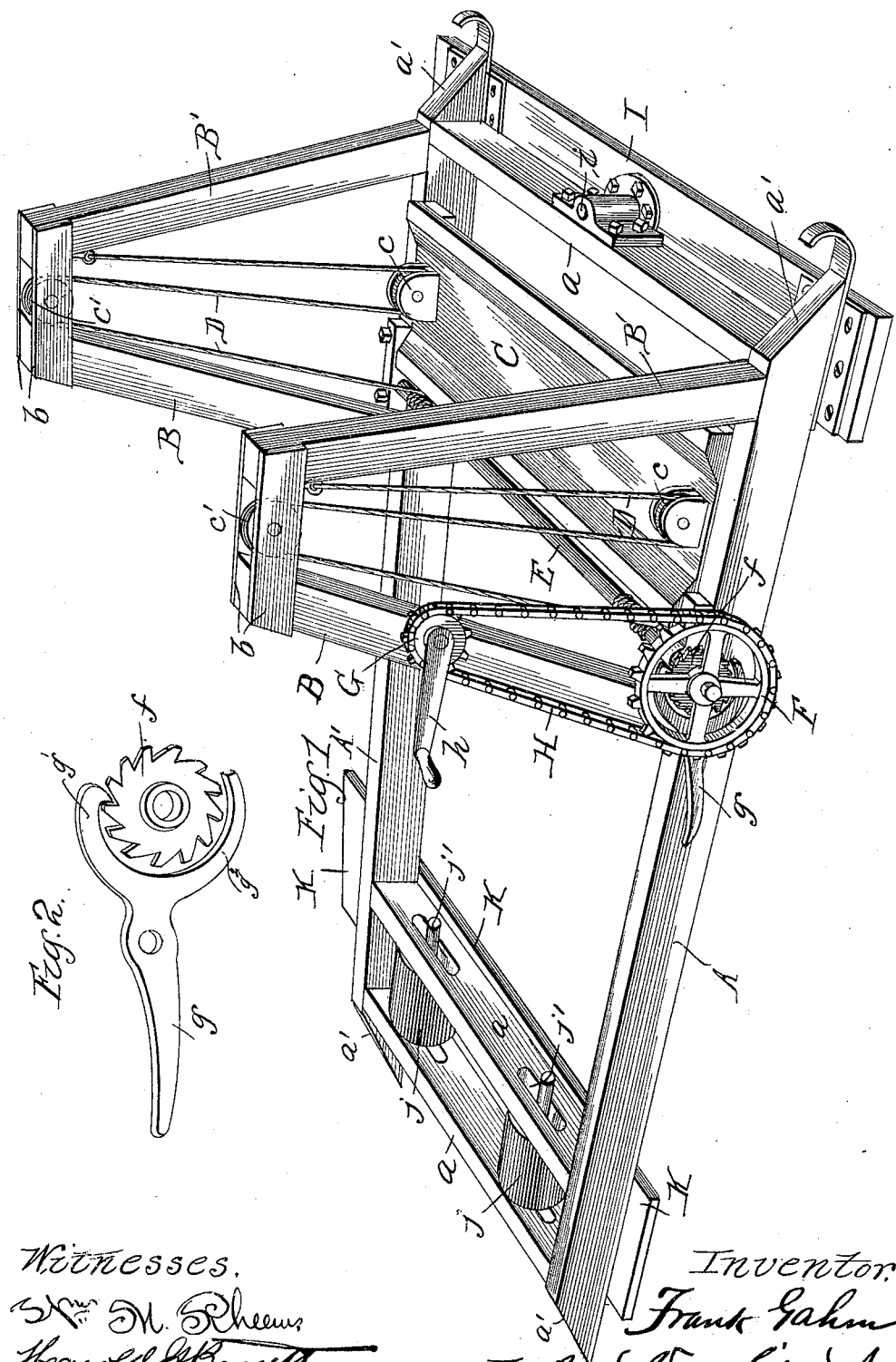

FRANK GAHM, OF RANSOM, ILLINOIS.

COMBINATION ELEVATOR AND WAGON-DUMP.

SPECIFICATION forming part of Letters Patent No. 615,694, dated December 13, 1898.

Application filed December 15, 1897. Serial No. 661,991. (No model.)

*To all whom it may concern:*

Be it known that I, FRANK GAHM, a citizen of the United States, residing at Ransom, in the county of La Salle and State of Illinois, have invented certain new and useful Improvements in Wagon-Dumps, of which the following is a specification, reference being had to the accompanying drawings.

My invention relates to wagon-dumps, and has for its object to provide a cheap, strong, and light device that is especially adapted for use in delivering the contents of a wagon placed thereon in various directions through a doorway of a barn, corn-crib, or other building.

In the drawings, Figure 1 is a perspective view of the device as a whole. Fig. 2 is a similar view, being a detail of the ratchet-wheel employed in connection with the elevating devices and showing also the combination dog and brake that acts upon said wheel.

In the figures of the drawings, A A' indicate the side bars of a horizontal frame, which are connected by suitable cross-pieces $a$. Upon these side bars A A' there is to be secured a suitable flooring, which, however, is omitted in the drawings for the purpose of better illustrating the several parts. At each end these side bars are beveled, as shown at $a'$, upon which beveled ends flooring-boards are also to be secured, and by reason of this incline or bevel a wagon can be readily drawn upon or off from the floor of the machine.

B B' represent posts or standards secured at their lower ends near one end of the device and inclined toward each other at their upper ends, where they are secured by any suitable means, the means shown being two cross-strips $b$. The two sets of frames thus made by the parts B B' $b$ are provided one on each side of the machine and opposite each other.

C represents a movable portion of the flooring and extends from side to side of the machine on the side bars A A', and, as shown, this movable portion C is concaved or has its central portion depressed to receive the front wheels of a wagon and prevent the wagon slipping when such movable portion C is raised to dump the contents of the wagon.

D is a suitable cable that in the construction shown is secured at one end at the top of each of the frames B B', which cable is passed down and under a pulley $c$, secured at each end of the movable section C, and thence passes up and over a pulley $c'$, from whence it passes down to a shaft E, to which it is secured. Each frame B B' is provided with a cable secured in position as just described.

The shaft E referred to extends across the machine and is secured in suitable boxes on the side bars A A', and when the flooring is secured in place such shaft E should be covered thereby, so as to prevent the same from being interfered with as the wagon is drawn into place. As shown, one end of the shaft E projects beyond the side of the side bar A and has secured thereto a sprocket-wheel F and a ratchet-wheel $f$, with which ratchet-wheel a combined dog and brake, suitably pivoted in place, engages. As most clearly shown in Fig. 2 of the drawings, said combined dog and brake consists of a handle portion $g$, which is forked or bifurcated at its end to form a pawl $g'$ and an opposed brake-arm $g^2$, which embrace the opposite sides of the ratchet-wheel $f$. Said pawl and brake-arm are adapted to alternately engage the ratchet-wheel—that is to say, when the pawl is thrown into engagement with the ratchet-teeth to hold the shaft E stationary the brake-arm $g^2$ will be thrown out of engagement with the teeth but when the pawl is released to lower the load the brake-arm is thrown into contact with the end of the ratchet-teeth and acts as a friction-brake to retard the rotation of the shaft E, as will more fully hereinafter appear. Upon the upright B, as shown, over the sprocket-wheel F, is suitably secured a pinion G, and over this pinion G and the sprocket-wheel F runs a drive-chain H, the pinion being turned by a suitable handle $h$.

I indicates a board placed beneath one end of the machine and pivotally secured in place by a pin or pivot $i$. At the opposite end of the machine, between two of the cross-pieces $a\ a$, are secured two rollers $j\ j$, which are free to move in slots $j'\ j'$ in such cross-pieces $a\ a$ in order to prevent binding when that end of the machine is moved in the arc of a circle. As shown, a board K is placed under the end of the machine for the rollers to move upon. Of course a board, such as K, would not be needed if the machine rested on hard smooth ground or on the floor of a building.

The horizontal side bars A A' of the machine are shown as being wider apart at one end than at the other, and while this is not necessary, as they could be made parallel, yet it is desirable in many instances, as it allows the narrow end of the machine to be swung around to receive a wagon in a narrow crib or barn driveway.

In operation the device is adjusted to the desired position to have the load from the wagon properly delivered, and the wagon is then drawn upon the floor of the machine until its front wheels rest in the concaved or depressed movable section C. To discharge the load from such wagon, the handle $h$ is then to be turned, which through the chain H and sprocket-wheel F will rotate the shaft E, winding up thereon at each end the cables D, which of course will elevate the movable section C, and with it the front end of the wagon, causing the load to be discharged from the other end. When elevated sufficiently, the movable section C is held in its elevated position by means of the attendant causing the dog $g$ to engage the ratchet-wheel $f$, and when it is desired to lower such section C and the wagon the attendant disengages the dog from the ratchet-wheel, and by forcing the arm opposite the dog into engagement with the ratchet-wheel causes it to act as a brake, so that the descent is allowed to be made gradually.

The machine, as shown, is very simple in construction, can be readily made, and by reason of being pivoted at one end to the board I and being provided with rollers at its opposite end can be very readily and quickly adjusted to a proper position for discharging a load from the wagon where desired. After being placed in proper position to receive the wagon it of course is desirable that the machine be immovable, and a simple device may be employed to block the rollers or raise them out of contact with the board K, if such board be employed, or from the ground or floor upon which the machine may be resting. I have not deemed it necessary to show any such means, however, as such devices are well known.

That which I claim as my invention, and desire to secure by Letters Patent, is—

1. In a wagon-dump, the combination with a platform pivoted at one end, of rollers at the opposite end, whereby the device as a whole can be swung horizontally on its end pivot, a vertically-movable section on said platform adapted to receive the forward wheels of a wagon, and means for raising and lowering said section, whereby after the platform has been swung into the desired position the contents of the wagon may be dumped, substantially as described.

2. In a wagon-dump, the combination with a platform adapted to receive a wagon, of a vertically-movable section adapted to receive the forward wheels of a wagon, a hoisting-shaft and cables for raising and lowering the movable section, a ratchet-wheel on said shaft, and a pivoted pawl adapted to be thrown into and out of engagement with the ratchet-wheel and provided with an opposed brake-arm arranged to bear against the ends of the ratchet-teeth when the pawl is thrown out of engagement therewith, substantially as described and for the purpose specified.

3. In a wagon-dump, the combination with a platform pivoted at one end and adapted to receive a wagon, of a vertically-movable section adapted to receive the forward wheels of a wagon, a hoisting-shaft and cables for raising and lowering the movable section, a ratchet-wheel on said shaft, and a pivoted pawl adapted to be thrown into and out of engagement with the ratchet-wheel, substantially as described.

FRANK GAHM.

Witnesses:
J. R. WORMLEY,
GEORGE BRADY.